Feb. 21, 1928.

J. LORENTZ

BELT FASTENER

Filed Dec. 7, 1926

Inventor:
John Lorentz,
By H. S. Woodward,
Attorney

Patented Feb. 21, 1928.

1,659,883

UNITED STATES PATENT OFFICE.

JOHN LORENTZ, OF BERGEN, NORWAY.

BELT FASTENER.

Application filed December 7, 1926, Serial No. 153,189, and in Norway March 27, 1926.

The invention relates to belt fastenings, and particularly to that kind in which a connecting or linking element is secured to the belt ends by spurs or points driven into the material of the belt. It is a special aim of the invention to provide a fastener of this kind in which no metal will be exposed on the inner side of of the belt; nor clinching or upsetting of points or parts required in order to avoid such exposure of metal on the pulley face of the belt, or to retain the fastener in place. In its present embodiment, the fastener presents a construction adapted to permit connection of belt ends by means of a pin inserted through parts projected from the respective ends of the belt in overlapped or intermeshed relation, and aims to present an improved manufacture of the unit link or coupling device with a combined fastener means which is adapted to be applied to the belt by the mere act of pressing it into the back face of the belt and which will have high efficiency in the essential functioning required of such devices.

Additional objects, advantages and features of invention will be understood from the following description, and accompanying drawings, wherein Figure 1 is a back view of the joint or connection between ends of a belt, in accordance with my invention, Figure 2 is a perspective view of one of the link members.

Figure 1:
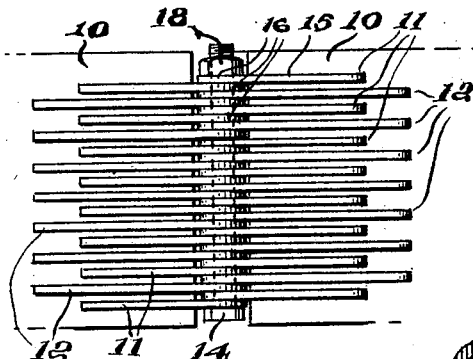
Figure 2:
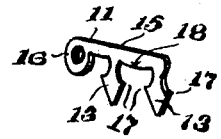
Figure 3:
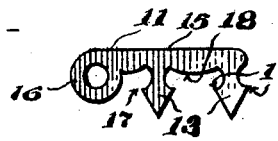
Figure 3 is a side view thereof.
Figure 4:
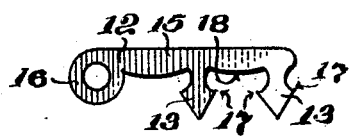
Figure 4 is a side view of the link device alternated with the one shown in Figure 3.
Figure 5:
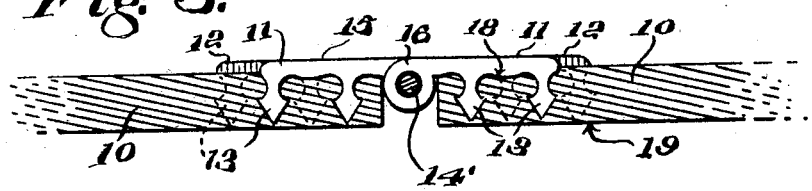
Figure 5 is a longitudinal sectional view of the joint shown in Figure 1.
Figure 6:
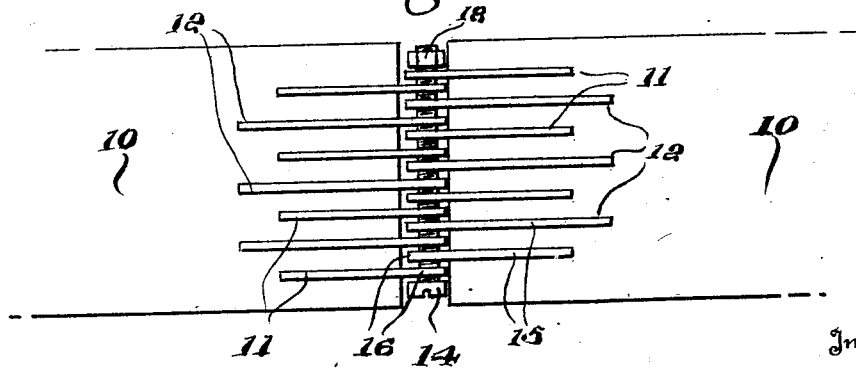
Figure 6 is a view similar to Figure 1, showing a joint made with a smaller number of link units.

There is illustrated a belt 10 having its extremities connected by a series of alternated short and long links or coupling devices 11 and 12, each stamped integrally from sheet metal, having spurs or prongs 13 projected from one edge which are forced into the back or outer face of the belt, the ends of the links projecting longitudinally beyond the end edges of the belt, so that the studs in each end of the belt may intermesh and receive commonly therethrough a coupling bolt or pin therethrough. Each link consists of a planiform bar 15, having an offset eye 16 in the same plane with the bar, and two prongs or spurs 13 projected from one edge in the same direction and plane as the offset of the eye 16. These spurs are each substantially in the shape of an arrow head, the barbs 17 thereof being so shaped as to prevent casual withdrawal from the material of the belt after they have been driven thereinto. The spurs 13 on each link 11 and 12 are spaced the same distance from each other, but those on the links 12 are spaced from the eye 16 further than the spurs on the link 11, thus lengthening the link 12 correspondingly. This increased distance from the eye is equal to half the distance between the spurs, so that when all are assembled and applied as shown in Figure 1 (links 11 and 12 alternated on each belt end), the spurs have a staggered arrangement across the belt. The edge of the bar 15 adjacent and between the spurs, as well as between the eye 16 and the first spur, is convexly arcuate.

In the use of my invention, in order to connect the belt ends the necessary number of links to properly connect the belt involved are assembled upon the bolt 14 in the position shown in Figure 1, and a nut 18 then screwed upon the bolt so as to clamp all of the links together between the nut and the head of the bolt. The links are asembled in two sets extended at opposite sides of the bolt, in each set the links 11 and 12 being alternated, the points of both sets being all presented in the same direction. When clamped by the nut 18 in the proper arrangement, the assembly is then laid over the ends of the belt 10 while positioned as shown in Figure 1, and then the spurs 13 are forced into the belt by blows of a hammer or other instrument delivered upon the back edges of the bars 15, or a member laid upon or across the bars and pressed or hammered upon. Installation may also be effected in other ways and by use of any usual or special tools which may be desired to develop for the purpose. After the parts have been secured satisfactorily in the belt, the bolt 14 may be removed and any usual fiber or rawhide pin inserted through the meshed eyes 16 in accordance with familiar practice in belt fastenings.

The spurs 13 are of a length with relation to the adjacent edges of the bars 15 to stop short of the pulley face 19 of the belt when driven properly thereinto. The arcuate edge portions of the bars 15 between the spurs and between the eye and the next spur serve as stops to prevent the device from being driven too far into the material, and also function to draw the spurs backward slightly, so as to prevent loose working of the spurs in the material of the belt objectionably.

The thickness of the metal used in the links 15, as well as the length of the link and the length of the spurs 13 may be varied to suit the various proportions of belts to be secured and the strength of the materials of the belt, and the construction of the device may be modified in various ways within the scope of the claims. It is to be noted that it is desirable that the shank of the bolt 14 should snugly fit the eyes 15 of the links when clamped thereon as a preliminary to application of the connection to the belt, but snug fit is less essential in the fibre or rawhide pin 14' if substituted for the bolt 14. It is also desirable that the barbs 17 be spaced from the edges 18 of the bar 15 a sufficient distance to allow a substantial body of material of the belt to intervene, as will be understood.

I claim:

1. A belt and fastening comprising opposed belt ends, a multiplicity of planiform links each of sheet form and comprising a bar, a plurality of spurs projecting from one edge thereof and substantially arrow-shaped embedded in the back portion of the belt and with barbs adapted to oppose withdrawal of the spurs from the belt material, the bar being convex between said spurs to engage the belt, said links having eyes projected from the respective ends of the belt and intermeshed and a connection therebetween.

2. A set of fastenings for splicing belts, comprising a long link having a back bar provided with an eye and having longitudinally spaced spurs projecting in the same direction, all of uniform thickness and in a common plane; and a short link similar to the first, the spurs thereon being spaced differently from the eye, the difference in said spacing from the eye in the second link equalling one-half the space between the first mentioned spurs of the first named links.

In testimony whereof I affix my signature.

JOHN LORENTZ.